May 22, 1923.
J. EATON
1,456,100
TIME ELEMENT CIRCUIT CONTROLLER
Filed Jan. 15, 1920
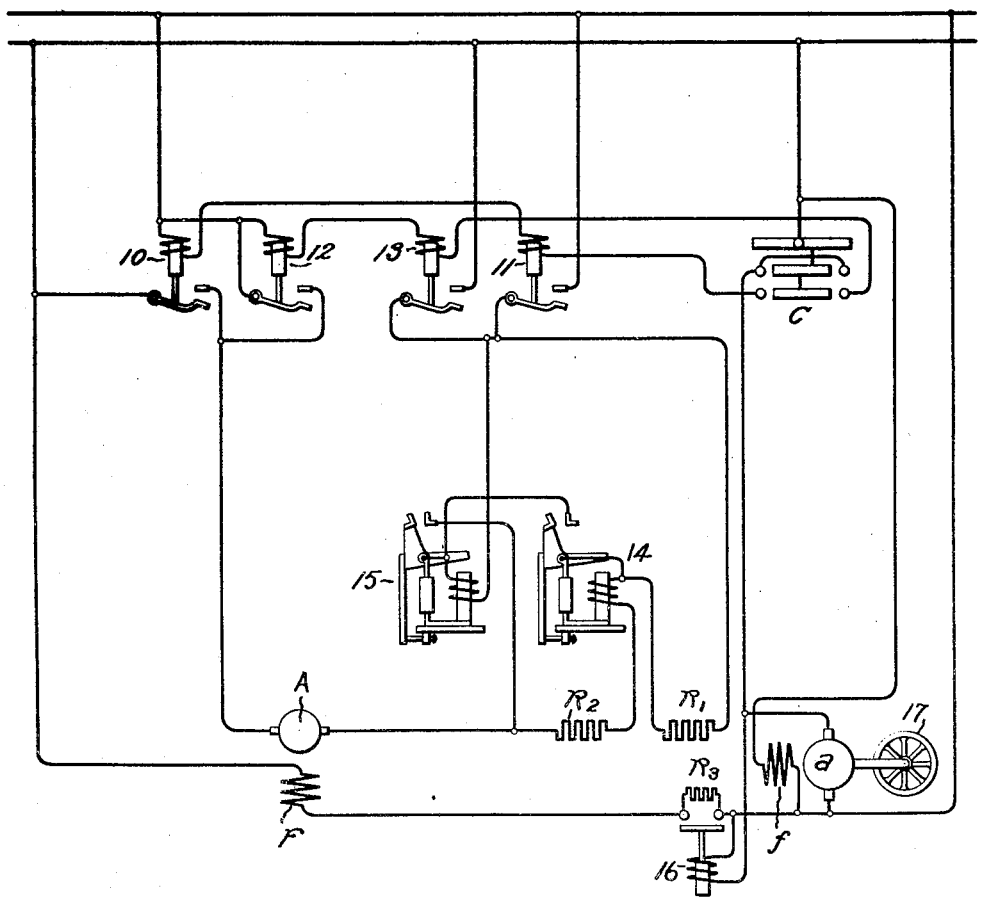
Inventor:
John Eaton,
by
His Attorney.

Patented May 22, 1923.

1,456,100

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

TIME-ELEMENT CIRCUIT CONTROLLER.

Application filed January 15, 1920. Serial No. 351,730.

*To all whom it may concern:*

Be it known that I, JOHN EATON, a subject of the King of Great Britain, residing at Schenectady, in the county of Schenectady, State of New York, have invented certain new and useful Improvements in Time-Element Circuit Controllers, of which the following is a specification.

My invention relates to time element devices for controlling electric circuits and it provides improved means whereby a definite time interval in the control of an electric circuit is provided. One of the objects of my invention is to provide a time element device which will be simple and positive in action and one which has little likelihood of getting out of adjustment.

In carrying my invention into effect, I provide an electric motor, and an electromagnetic switch which is energized responsively to the motor armature voltage, the arrangement being such that when the motor is connected to a source of supply, the electromagnetic switch will instantly close and thereby effect the closing of the circuit which it is desired shall be maintained closed. When the motor is deenergized, the electromagnetic switch is maintained closed for a definite interval against its bias to the open position by reason of the fact that the motor will operate as a generator to maintain the energization of the coil of the electromagnetic switch. When the speed of the motor has dropped to such a value that the generated voltage is less than that required to maintain the electromagnetic switch closed, the switch will automatically open the controlled circuit. A definite time interval will thus be provided between the time at which the motor was disconnected from the source of supply and the time at which the electromagnetic switch opens. In the preferred form of my invention, I provide the motor with a fly-wheel so that the motor will have considerable inertia, and by varying the weight of this fly-wheel I am able to vary the time limit. The time limit may also be obviously varied by varying the excitation of the motor.

For a better understanding of my invention, reference is had to the accompanying drawing wherein I have illustrated diagrammatically and in simplified form an embodiment of my invention in the control of the shunt field of an electric motor. Referring to the drawing, the electric motor, having an armature A, and a shunt field F which is adapted to be controlled in accordance with my invention, is adapted to be started, stopped and reversed by means including the controller C. The electromagnetic switches 10 and 11 are provided for connecting the motor armature to the source of supply for operation in one direction and the electromagnetic switches 12 and 13 are provided for connecting the motor armature to the source for operation in the other direction. The electromagnetic switches 14 and 15, having series windings, are the well-known type which are magnetically held open when the current taken by the motor armature is in excess of a predetermined value and are closed and magnetically held closed when the motor current drops to the predetermined value. The switch 14 is adapted to short circuit the starting resistor $R^1$ and the switch 15 is adapted to short circuit the start-resistor $R^2$. The resistor $R^3$ included in the circuit with the field F is adapted to be controlled by means of the electromagnetic switch or relay 16. The winding of this relay is connected across the armature $a$ of an electric motor, the rotating element of which has considerable inertia. In the particular arrangement shown, the rotating element of this armature is given a considerable inertia by the provision of a fly-wheel 17 connected thereto. This electric motor is provided with a shunt field $f$.

As thus constructed and arranged, and with the parts in the position as shown in the drawing, the operation of my invention is as follows: Turning the controller C to the right to its operative position energizes the electro-magnetic switches 12 and 13 to connect the motor armature A to the source of supply through a circuit including the resistors $R^1$ and $R^2$. Simultaneously therewith the armature $a$ is connected to the source of supply and the winding of the relay 16 is also connected to the source of supply, so that the relay 16 will close its contacts and short circuit the resistor $R^3$ in the motor field F. The starting resistors $R^1$ and $R^2$ will be automatically short circuited as the motor increases in speed by means of the series contactors 14 and 15 in a well understood manner, and the motor having the fly-wheel connected to its rotating element will also be accelerated to full operating speed. Assume now that the controller C is returned through its off position to its other operative position, the contactors 12 and 13 will be deenergized and open their contacts and the contactors 10 and 11 will be energized to close their contacts so as to connect the motor armature to the source of supply with the current through the motor armature reversed for operation in the reverse direction. When the controller C passes through the off position and the contactors 12 and 13 are deenergized, the series contactors 14 and 15 are also deenergized to reinsert the starting resistors $R^1$ and $R^2$ in the motor armature circuit. By reason of the fact that the armature $a$ has considerable inertia effect, it will operate as a generator to maintain the energization of the winding of the relay 16, and while the controller is thrown to its left-hand position, the armature $a$ will be connected to the source of supply in the same manner as before. It will be observed that in passing through the off position of the controller, the field F is maintained at full strength since the relay 16 is maintained closed by reason of the generated current of the armature $a$. If the controller C is now returned to the off position and left there, the armature A will be disconnected from the source of supply, but the relay 16 will be maintained closed so as to maintain full field strength for the shunt field F, for a definite interval determined by the inertia effect of the armature $a$ and the excitation of the field $f$. After the predetermined interval, the generated voltage of the armature $a$ will have decreased to such a value that the relay 16 will be permitted to open its contacts in accordance with its bias and insert the resistor $R^3$ in the circuit of the shunt field F. It will be observed that with this arrangement the excitation of the shunt field F is at full strength at starting and is maintained at full strength when the direction of current in the motor armature A is reversed, but that in case the controller C is returned to the off position and left there, the current in the shunt field F will be automatically reduced to prevent over heating after a definite interval of time determined by the inertia effect of the armature $a$ and the degree of excitation of the shunt field $f$.

Although not essential to my invention, the electric motor having the armature $a$ and shunt field $f$, the fly-wheel 17 and the relay 16 will ordinarily be constructed in the form of a relay, all the parts of which will be enclosed in a single case which may be used as a unit for various applications. It will be understood that this motor will ordinarily be of considerably smaller size than the motor controlled thereby, since the amount of work performed by the motor is relatively quite small.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A time element device comprising a circuit controller, an electric motor the rotating element of which has a relatively large inertia controlled by said controller, an electromagnetic switch, and connections between the said motor, the winding of said switch and the said controller, whereby the switch winding and motor are simultaneously operatively energized responsive to the operation of the controller, and the switch is maintained energized responsively to the generated voltage of the motor when the motor and the switch winding are disconnected from the source of supply by the subsequent operation of the controller.

2. The combination in a time element device of an electric motor having a shunt field energized form a source of supply, an electromagnetic switch biased to one position and having its energizing winding connected across the motor armature, a circuit external to the motor controlled thereby, and a common connection for the armature of said motor and the winding of said switch whereby energizing the motor armature from the source of supply causes the winding of said switch to be energized to move the switch to another position against its bias and disconnecting the motor armature from the source causes the winding of said switch to be energized from the motor operating as a generator so as to maintain the switch in said other position against its bias for an interval of time determined by the inertia effect of the rotating element of said motor.

3. The combination in a time element device of an electric motor, a controller therefor, an electromagnetic switch energized responsively to the voltage drop across the motor armature a circuit external to the motor controlled thereby, and connections whereby closing the motor circuit through the operation of the controller simultaneously energizes the electromagnetic switch to close the controlled circuit and moving the controller to the off position causes the electromagnetic switch to be energized from the motor operating as a generator so as to maintain the controlled circuit closed for a definite time interval after the motor controller is moved to the off position.

In witness whereof, I have hereunto set my hand this 13th day of January 1920.

JOHN EATON.